United States Patent
Clerkin (10) Patent No.: US 7,416,469 B2
(45) Date of Patent: Aug. 26, 2008

(54) HONEYCOMB FOUNDATION FOR BEEHIVES

(76) Inventor: James F. Clerkin, Arabella House, Ballymacelligott, Tralee (IE)

( * ) Notice: Subject to any disclaimer, the term of this patent is extended or adjusted under 35 U.S.C. 154(b) by 11 days.

(21) Appl. No.: 11/464,786

(22) Filed: Aug. 15, 2006

(65) Prior Publication Data
US 2007/0037481 A1    Feb. 15, 2007

(30) Foreign Application Priority Data
Aug. 15, 2005 (IE) ................. S2005/0535

(51) Int. Cl.
*A01K 47/04* (2006.01)
(52) U.S. Cl. .................................... 449/44
(58) Field of Classification Search ............ 449/30, 449/42, 44, 45, 58, 60; 428/116–118
See application file for complete search history.

(56) References Cited

U.S. PATENT DOCUMENTS

| | | | |
|---|---|---|---|
| 215,336 A | * | 5/1879 | Detwiler ...................... 449/45 |
| 979,765 A | * | 12/1910 | Husted ......................... 449/45 |
| 994,559 A | * | 6/1911 | Aspinwall ..................... 449/44 |
| 1,323,870 A | * | 12/1919 | Kunkel ......................... 449/45 |
| 1,412,457 A | | 4/1922 | Dadant |
| 4,261,068 A | | 4/1981 | Cho |

FOREIGN PATENT DOCUMENTS

| | | |
|---|---|---|
| EP | 0099838 A1 | 5/1983 |
| GB | 1024829 | 4/1966 |
| GB | 2144318 A | 3/1985 |

* cited by examiner

*Primary Examiner*—Son T. Nguyen
(74) *Attorney, Agent, or Firm*—Greenlee, Winner and Sullivan, P.C.

(57) ABSTRACT

The present invention is concerned with providing an artificial honeycomb foundation sheet for use in beehives or the like, said foundation sheet being generally planar in form and comprising a three dimensional lattice of struts which define, on both sides of the sheet, a respective array of depressions which correspond geometrically with natural honeycomb cell bases, the array on one side of the sheet being nested with the array of depressions on the other side of the sheet, and the entire sheet, in use, being coated in bees wax which forms membranes across lattice openings defined by the struts framing the depressions.

15 Claims, 9 Drawing Sheets

HONEYCOMB FOUNDATION FOR BEEHIVES

The present invention is concerned primarily with apiculture, and in particular to improvements in honeycomb foundation sheets for use in a beehive. The invention also relates to lightweight structural panels.

Since the invention of the moveable frame hive, bee keepers have sought to find a satisfactory method for replicating honeycomb as produced by bees in the wild. Artificial honeycomb in plastics and metal have been tried but are not widely accepted. Honeycomb midrib has been more successful. Known as foundation when provided by the beekeeper, this midrib supplies the cell pattern and cell base, on both sides of which bees draw their combs. It has been noted that bees draw comb with regular, predetermined characteristics more quickly and more economically, from foundation.

Conventionally, thin sheets of beeswax foundation are embossed with appropriately sized cell bases, reinforced with embedded wires, then mounted in frames to be placed in a hive. Reinforcement counters distortion due to loading and heat conditions of the hive and breakage during centrifugal honey extraction. Wire reinforcement, either straight or crimped, or in square or hexagonal grids, (eg. U.S. Pat. Nos. 1,412,457, 4,261,068, GB2144318) when embedded in the wax, affects cells through which it passes, leaving them unused by the bees, particularly in brood areas. Embedding wires in foundation is both a time and a labour intensive operation.

Other foundation sheeting materials have been employed, such as metal or plastics, (eg. GB1024829, EP0099838) either as a substitute for beeswax or incorporating beeswax as a component or finish. Such sheets have enjoyed varying degrees of success, not always being accepted by bees and requiring optimum hive conditions to be drawn.

Patent GB2144318 describes a two-dimensional mesh with hexagonal openings, which acts as a support or reinforcement for wax foundation. However, it would not appear that foundation can be made using the mesh without recourse to embossing rollers or the like to impart the desired inverted pyramid structure of a cell base. The hexagonal support is simply a less invasive form of reinforcement for a conventional sheet of wax foundation.

It is an object of the invention to provide an improved honeycomb foundation sheet in which the foregoing disadvantages are avoided or mitigated.

According to a first aspect of the present invention there is provided a honeycomb foundation sheet for beehives comprising a three-dimensional lattice of struts defining on at least one face of the sheet an array of depressions framed by the struts.

Preferably, each depression comprises a substantially hexagonal peripheral rim and three lattice openings extending away from the hexagonal peripheral rim and converging at an apex of the depression.

Preferably, the geometry of each depression corresponds substantially with the geometry of a honeycomb cell base.

Preferably, each edge of each depression is defined by a single strut.

Preferably, the lattice of struts are arranged to define an array of depressions on both faces of the sheet.

Preferably, the depressions on one face are integrated with the depressions of the other face.

Preferably, the apex of a depression on one face of the sheet forms a corner of the hexagonal peripheral rim of three adjacent depressions on the other face of the sheet.

Preferably, the struts are substantially triangular in cross section, preferably substantially deltoid in cross section.

Preferably, the struts defining each depression are oriented such that vertices of opposite struts point towards one another across each lattice opening.

Preferably, each of the lattice openings defined by the struts is substantially rhombic in shape.

Preferably, the struts forming each depression extend at an angle of less that 20° to the plane of the sheet, and preferably at an angle of between 9° and 14° to the plane of the sheet.

Preferably, the foundation sheet further comprises a plurality of substantially parallel further struts extending away from the vertices of the hexagonal peripheral rim of each depression, the openings between adjacent further struts corresponding to the walls of hexagonal cells.

Preferably, the foundation sheet further comprises a layer of beeswax covering the struts and forming a membrane across at least a majority of the lattice openings defined by the struts.

Preferably, the foundation sheet further comprises a support frame provided about the lattice of struts.

Preferably, the sheet is moulded from a plastics material.

According to a second aspect of the present invention there is provided a method of making a honeycomb foundation sheet for beehives, comprising forming a foundation sheet for beehives comprising a three-dimensional lattice of struts defining on at least one face of the sheet an array of depressions framed by the struts, which depressions comprise three lattice openings extending away from a hexagonal peripheral rim, coating the sheet in beeswax to provide a layer of beeswax covering the struts and forming a membrane across at least a majority of the lattice openings defined by the struts, and allowing the beeswax to solidify on the lattice.

As used herein, the term "sheet" is intended to mean a panel or the like which in overall dimension is substantially planar, but which on a local level may be three dimensional, and in particular by having pockets or depressions formed in one or both faces of the sheet, and which sheet is preferably formed from a lattice of struts which define openings therebetween.

As used herein, the term "depression" is intended to mean a hollow or cavity which need not have a solid wall or walls, and may simply be framed to provide an open sided depression.

As used herein, the term "framed" is intended to mean surrounded, outlined or otherwise defined by one or more framing element such as struts or the like which will typically be elongate in form and may be straight or curved along a longitudinal axis thereof.

As used herein, the term "hexagonal" is intended to mean a six sided shape whose individual sides need not be disposed in the same plane, and whose sides may be of equal or unequal length.

As used herein, the term "triangular" is intended to mean any shape having three sides, whether straight, curved or otherwise, and having a tip or vertex between each pair of converging sides, which tips or vertices may be rounded.

As used herein, the term "honeycomb cell base" is intended to mean the geometric arrangement found at the base of each hexagonal cell or tube of natural honeycomb, in which in place of a flat bottom, each cell ends in three four-sided, rhombic shaped panels or facets, meeting in a point or apex. Thus such bases are trihedral and pyramidal in shape, with the dihedral angles of all adjacent surfaces measuring approximately 120°.

Embodiments of the invention will now be described, by way of example, with reference to the accompanying drawings, in which.

Referring to FIGS. 1 to 5, a first embodiment of honeycomb foundation sheet 10 for beehives comprises a shallow three-dimensional lattice of substantially equal length struts 12 defining a regular array of substantially equal closely packed rhombic lattice openings 14 (by closely packed we mean that each rhombic opening shares each of its four peripheral struts 12 with a respective adjacent rhombic opening 14).

In this embodiment one end of each strut 12 meets the ends of five other struts 12 at a set of first junctions 16 and the other end of each strut 12 meets the ends of two other struts at a set of second junctions 18A and 18B, the set of first junctions 16 lying in a substantially common plane P (represented by the horizontal dashed line in FIG. 4) and adjacent ones 18A, 18B of the set of second junctions lying substantially equidistantly above and below the plane P respectively.

The result is that on each side of the sheet 10 a plurality of depressions 20 (FIGS. 4 and 5) are defined, and are framed by a plurality of the struts 12, each depression having a substantially hexagonal peripheral rim when viewed normal to the sheet (FIGS. 2 and 3) and whose struts 12 define three substantially equal rhombic openings 14 corresponding to the three facets of natural honeycomb cell bases. The bottom or apex of each depression 20 is the junction point 18A or 18B, and each rhombic opening 14 is shared by two depressions 20, one on each face of the sheet 10. Thus in effect each edge of each depression 20 is defined by a single strut 12, wherein each depression 20 has a total of nine edges, six defining the hexagonal rim and three converging edges therebeneath, which in combination with the hexagonal rim define the openings 14.

Each strut 12 may be a monofilament of any suitable cross section or a strut 12 may comprise multi-strands in various arrangements including twisted, woven, knotted, etc. In general, the honeycomb foundation sheet 10 may be made from moulded plastics, metal or any other suitable organic or synthetic fibre or material, which is accepted by the bees, compatible with hive products such as honey or wax, and is stable under hive conditions. The complex nature of the structure is compatible with mechanical knitting or crocheting techniques using fine fibres. Various conventional plastics forming techniques can also be used.

Figure 1:
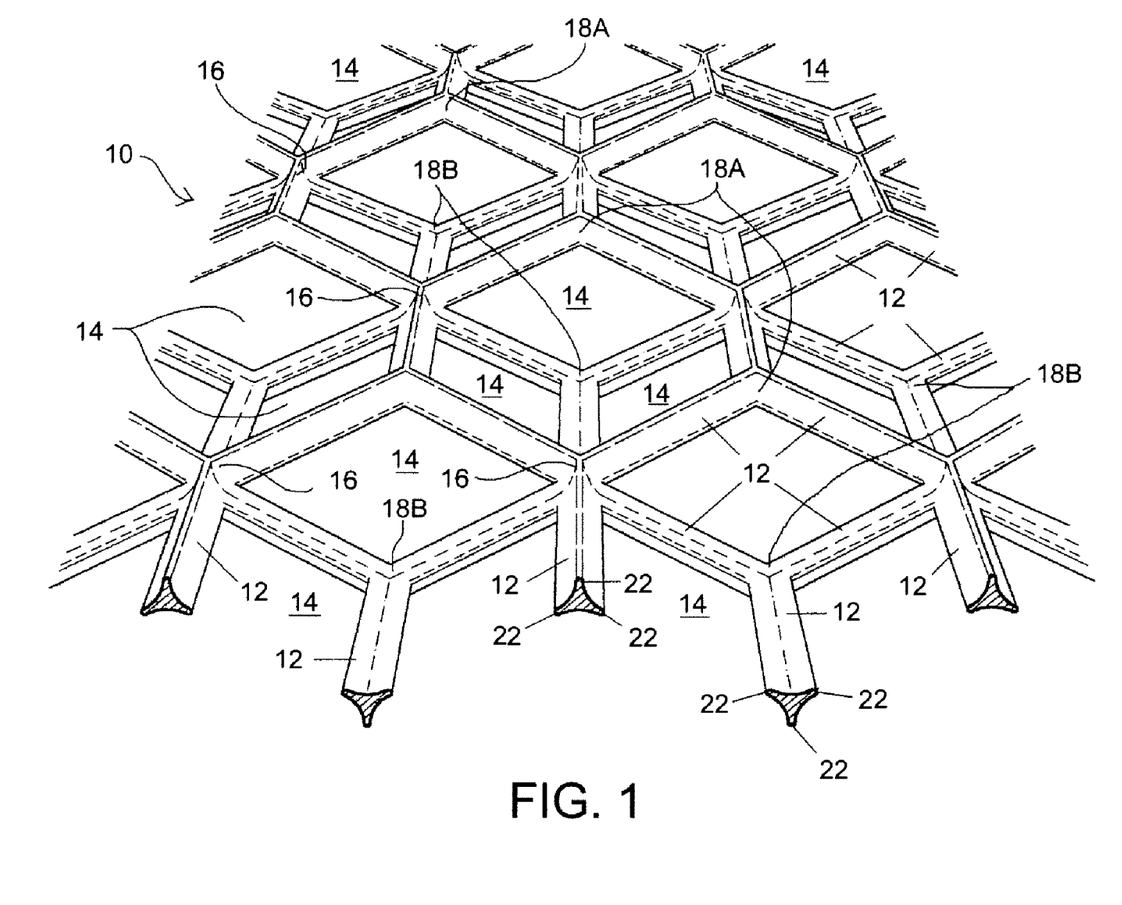
FIG. 1 is an enlarged perspective view of a section of foundation sheet according to a first embodiment of the invention.
Figure 2:
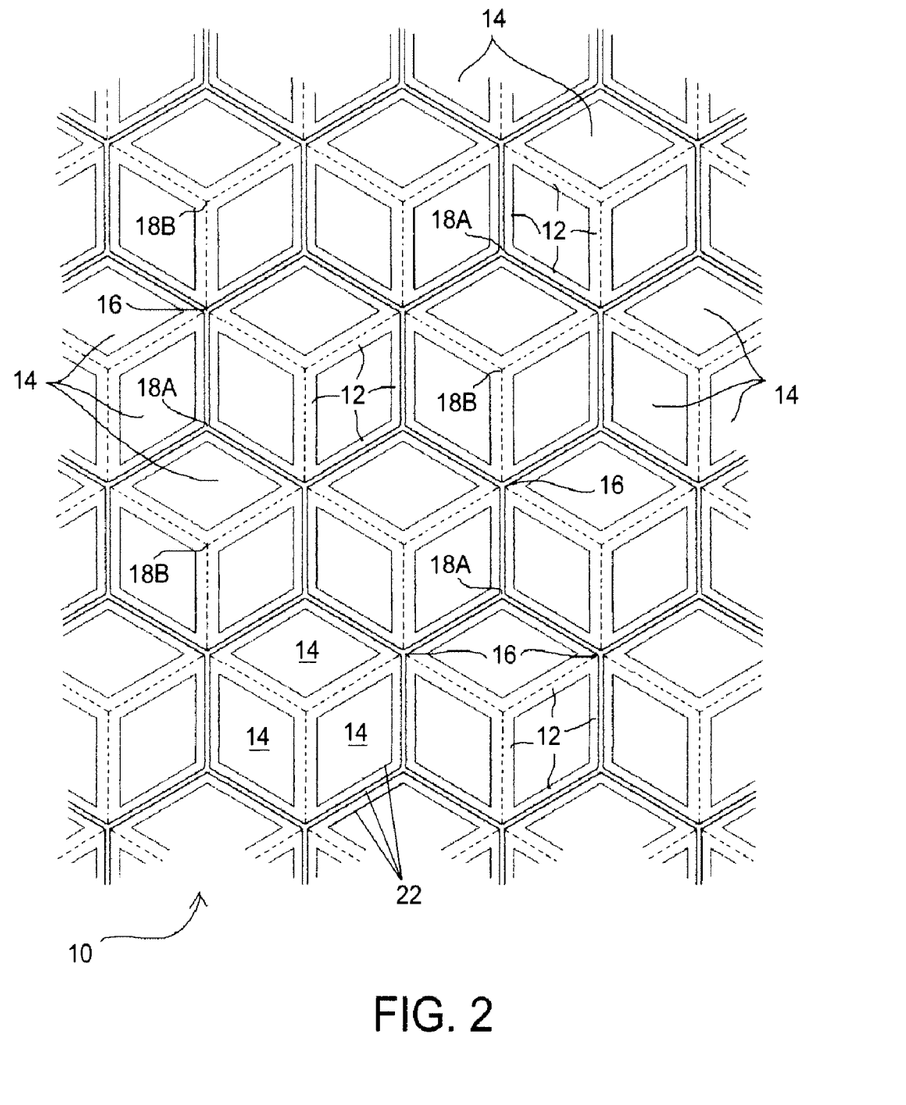
FIG. 2 is an elevational view of the foundation sheet of FIG. 1.
Figure 3:
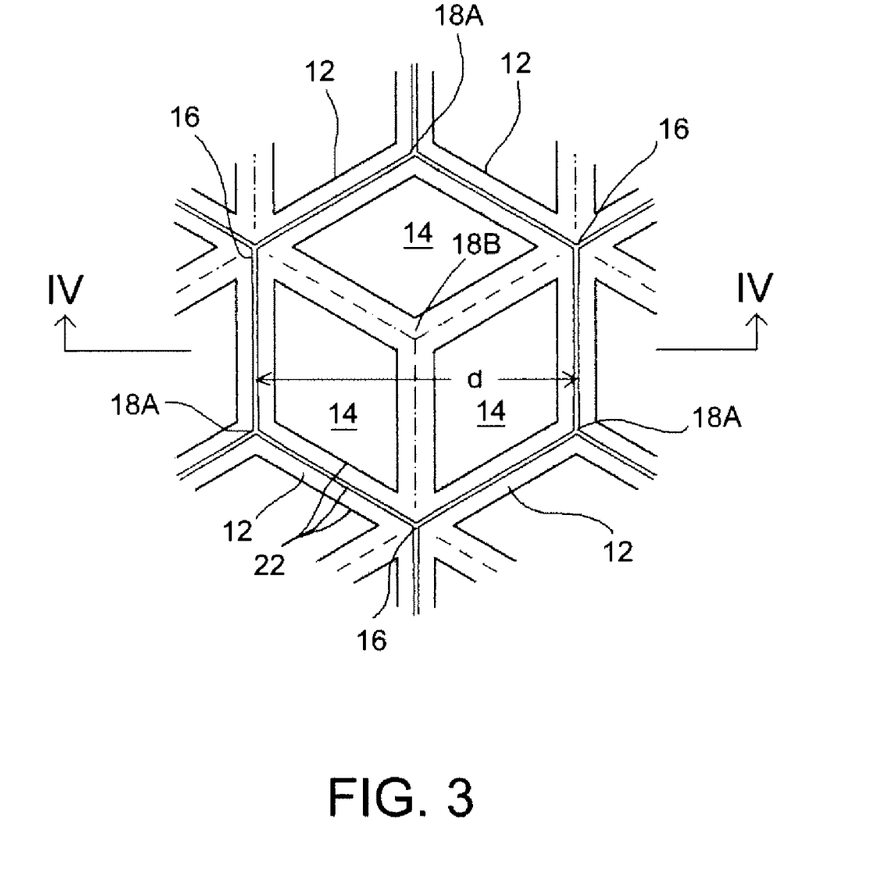
FIG. 3 is an enlarged elevational view of one of the cell bases of FIG. 2.
Figure 4:
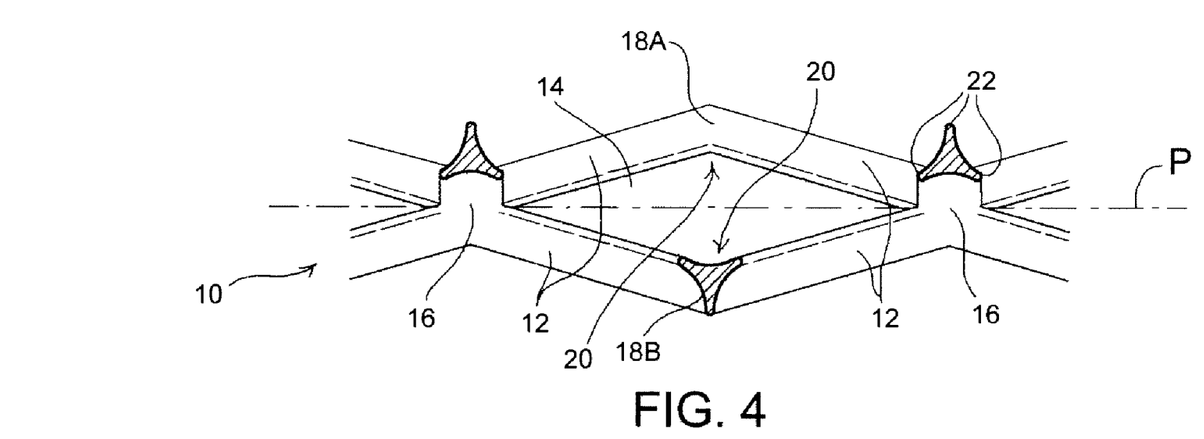
FIG. 4 is a cross section on the line IV-IV of FIG. 3.
Figure 5:
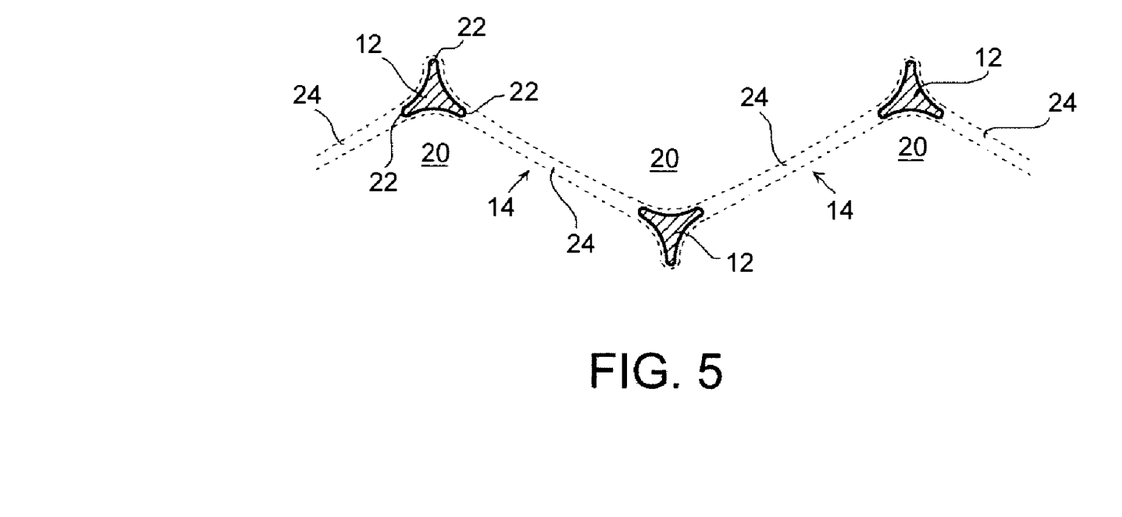
FIG. 5 is a cross section on the line IV-IV of FIG. 3 showing wax membranes across the rhombic openings (the background detail of FIG. 4 is omitted).

Preferably, however, and as shown in the drawings, each strut 12 has a generally triangular cross-section, and preferably substantially deltoid whereby each side of the strut 12 is concave, the struts 12 further having three equi-angularly spaced nib-like vertices 22. For reasons described in detail hereinafter, each of the struts 12 are preferably oriented such that the vertices 22 of opposite struts 12 point towards one another across each rhombic opening 14, as seen in FIGS. 1, 4 and 5.

The sheet 10 is preferable made integrally from an initial flat sheet of plastics material by stamping and heat deformation, although it will be appreciated that any other suitable technique may be employed.

The honeycomb foundation sheet 10 mimics natural midrib in that each rhombic opening 14 is inclined at about 30° to the centre plane P, and the depressions 20 interact back to back so that each rhombic opening 14 is shared by two depressions 20, one on either face of the sheet 10. The array of depressions 20 on one face of the sheet 10 are thus nested into the array of depressions 20 on the other face of the sheet 10. Preferably, the geometry of the depressions 20 will match those found in nature, appropriate to the race and caste of bee. In the case of Apis Mellifera races, for example, the width d of the depressions 20 or cell base, as measured across opposite sides of the hexagonal peripheral rim of the cell base (FIG. 3), will range from 4.9 mm to 7 mm.

Although the sheet 10 can be used "as is", allowing the bees to build up the wax cells on the bare three-dimensional skeletal structure, the sheet 10 is preferably coated in bees wax, such as being immersed in molten beeswax, withdrawn and allowed to cool and solidify. Typically, wax from old combs is recovered, mixed with clean comb cappings and melted in a double pan or the like. The double pan will have an outer container of hot water and means to control the temperature of the water. The inner pan will contain the above mentioned wax mixture. The inner pan should be large enough to contain the sheet 10 without deformation, and permit the complete immersion of same. To avoid contamination of the wax, a non reactive contain should be used, for example formed from stainless steel.

A sheet 10 is initially prepared by cutting or otherwise forming to the dimensions of the hive in which the sheet 10 will be housed. The sheet 10 is then suspended on hooks or the like, and immersed in the molten wax contained in the inner pan. The process thus resembles candle dipping. The emerging sheet 10 will be coated in a layer of wax, with the lattice openings 14 having a meniscus 24 of wax held by surface tension. As the sheet 10, still held vertically, is exposed to the air and thus reduced in temperature, the wax begins to cool and solidify. If a thicker or heavier layer of wax is required, the dipping process is repeated. The coated sheet 10 is now ready to be mounted with a hive.

This process coats the struts 12 with a thin layer of wax and forms the wax membranes 24 (FIG. 5) across the rhombic openings 14 due to surface tension. A majority, and typically 75%, of the openings 14 will contain a wax membrane 24 after this process. The wax coating can also be achieved using spray wax and painting techniques.

The provision of the triangular, and preferably deltoid, cross section for each strut 12 is beneficial when seeking to achieve this coating of wax on the sheet 10. In particular, the vertex 22 of each strut 12 of a lattice opening 14 faces towards the vertex of each of the other struts 12 of the opening 14. Each vertex 22 pointing across the opening 14 thus provides a well defined edge from which the membrane 24 can be formed and maintained, thereby increasing the efficacy of each opening 14 in generating and maintain the membrane 14 therein. The curved or concaved sides of the struts 12 also ensures that there is a gradual transition, in use, from each strut 12 or vertex 22 into the membrane 24, thereby again improving the formation and in particular maintenance of the membranes 24. This curvature may be altered to vary the thickness of the membrane 24.

The foregoing embodiment provides artificial midrib only, and leaves the bees to draw out the tubular hexagonal comb cells on each face of the sheet 10 using the defined cell bases 20. A second embodiment of the invention, FIGS. 6 and 7, also provides a framework for the six elongated generally rectangular cell walls forming each tubular honeycomb cell.

Figure 6:
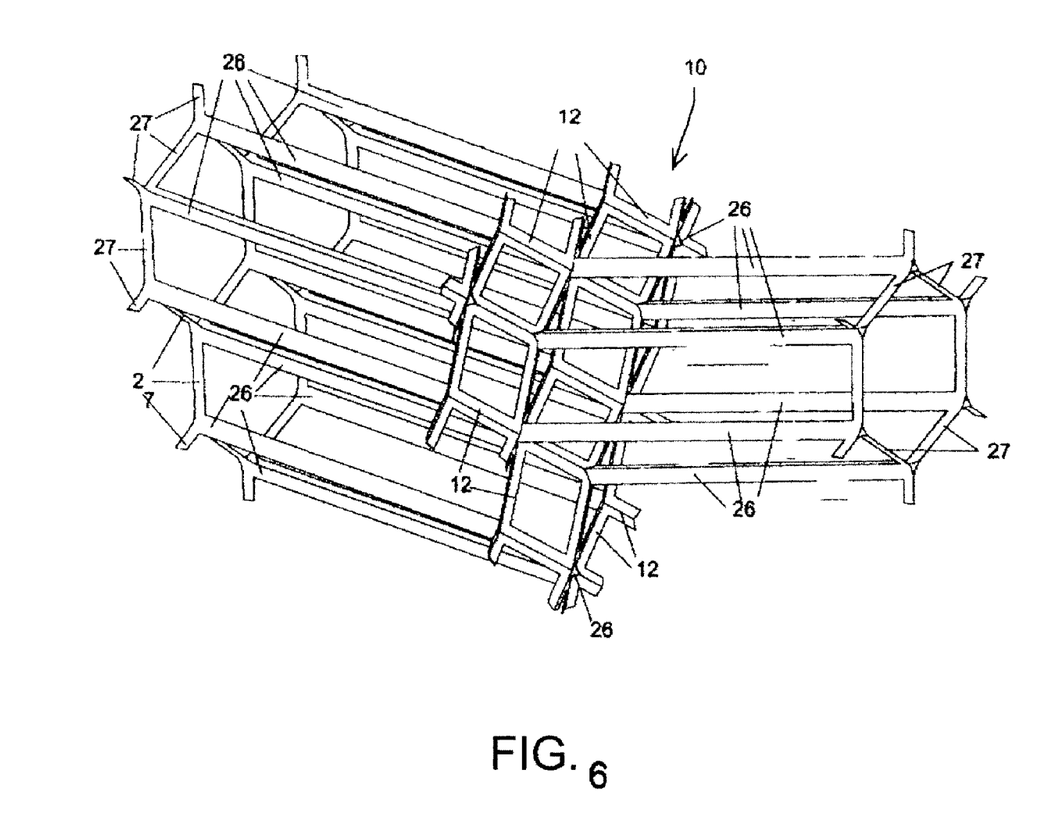
FIG. 6 is a perspective side view of a section of foundation according to a second embodiment of the invention including further struts defining cell walls.
Figure 7:
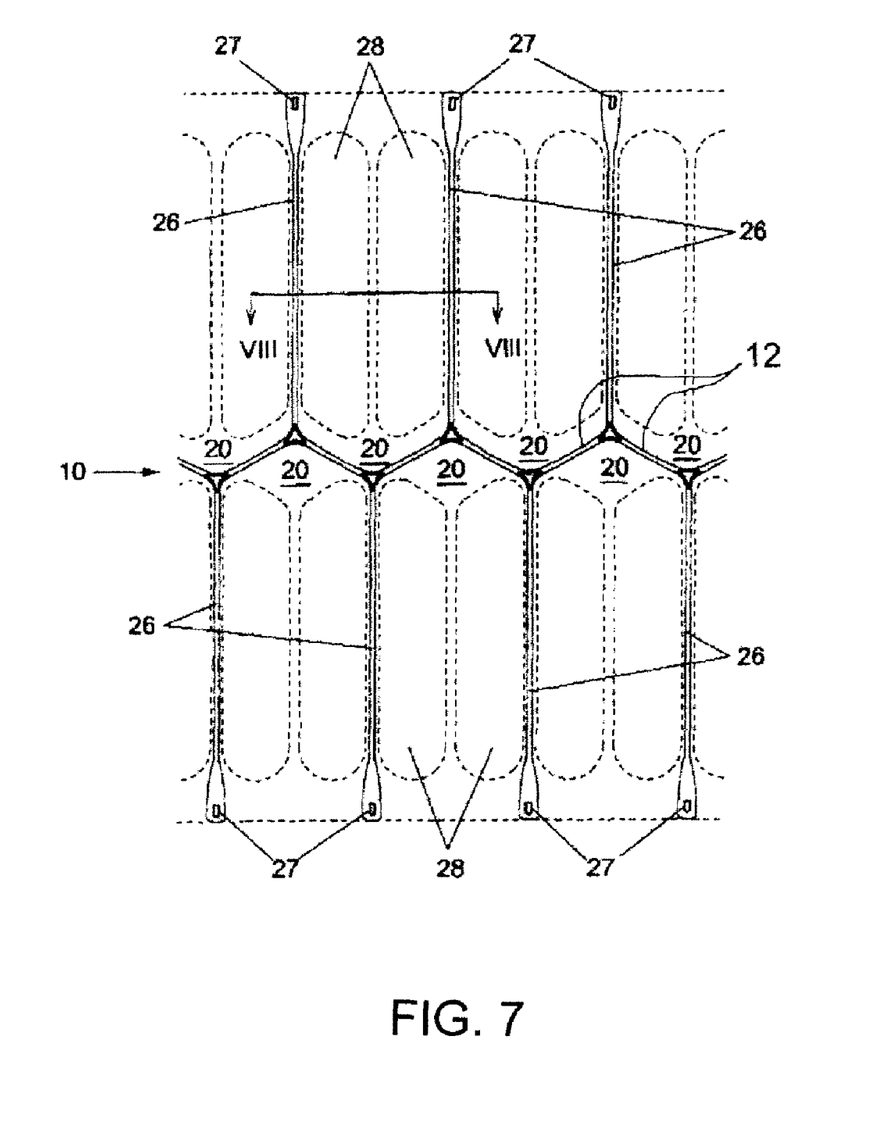
FIG. 7 is a cross-sectional plan view of a section of the second embodiment.
Figure 8:
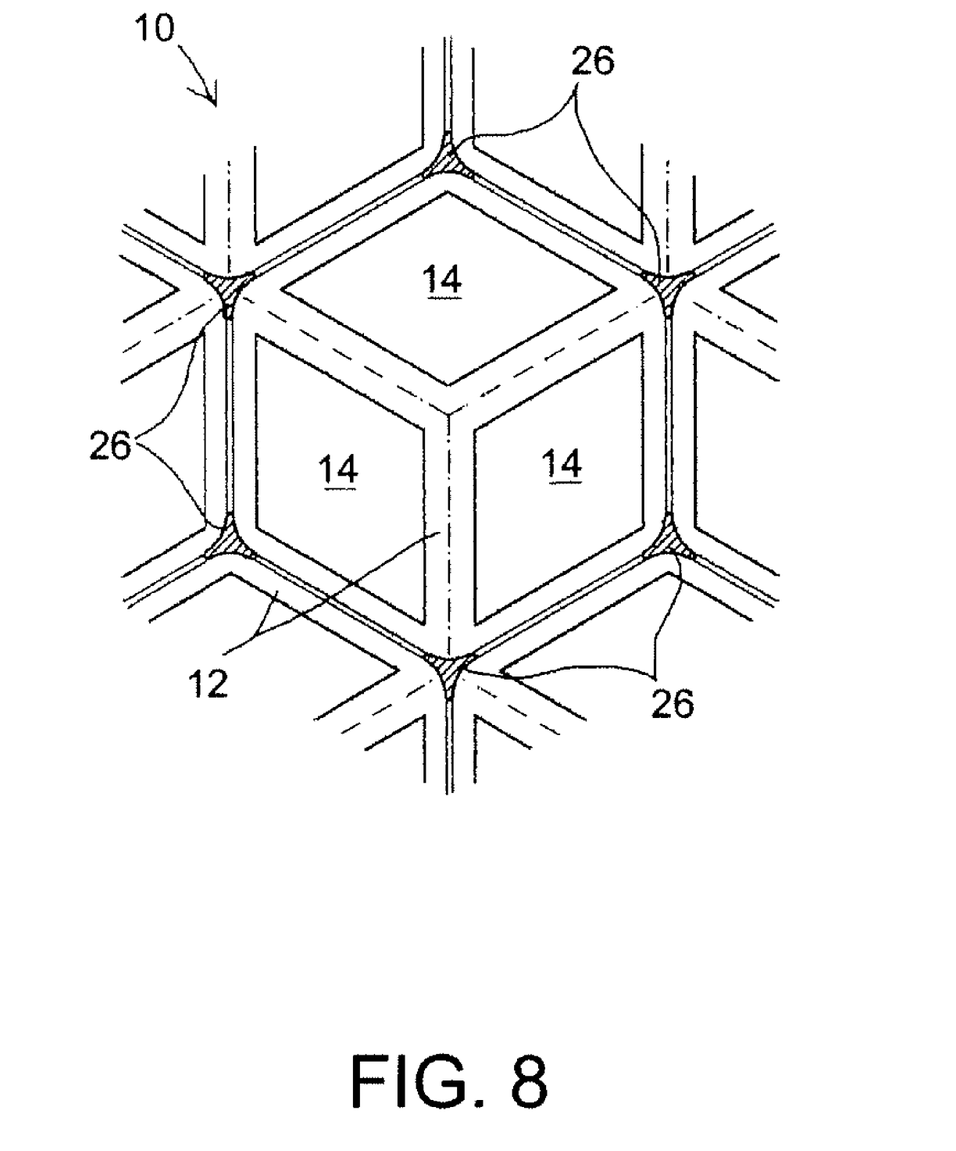
FIG. 8 is a view, similar to FIG. 3, of a single cell of the second embodiment of the invention, taken on line VIII-VIII of FIG. 7.

In the second embodiment, FIGS. 6 to 8, the foundation sheet 10 is exactly as before. However, in the second embodiment a plurality of substantially parallel further struts 26 are joined to, and extend away from, the vertices of each cell base on each face of the foundation sheet 10 (not all the struts 26 are shown in FIG. 6). These further struts 26, whose outer free ends are held together by a hexagonal mesh 27, define the walls of the honeycomb cells of which the depressions 20 form the bases. As before, the structure can be used "as is", but it is preferred to coat it in molten beeswax as described, so that after the beeswax has solidified a wax membrane 28 also extends across the wall openings defined by the struts 26.

Relative to the plane P, FIG. 4, which in use of the foundation 10 in a beehive is orientated vertically, the struts 26 may be at right angles or, as shown in FIG. 6, inclined at an upward angle ranging between horizontal and 20° with a preferred range of 9°-14°. The overall width of the structure, including the struts 26, will be consistent with its intended use within a hive and can vary with race and caste of bee. In the case of Apis Mellifera races, overall width will range between 10-80 mm with a useful range of 20-35 mm for worker and drone-sized cells.

Figure 9:
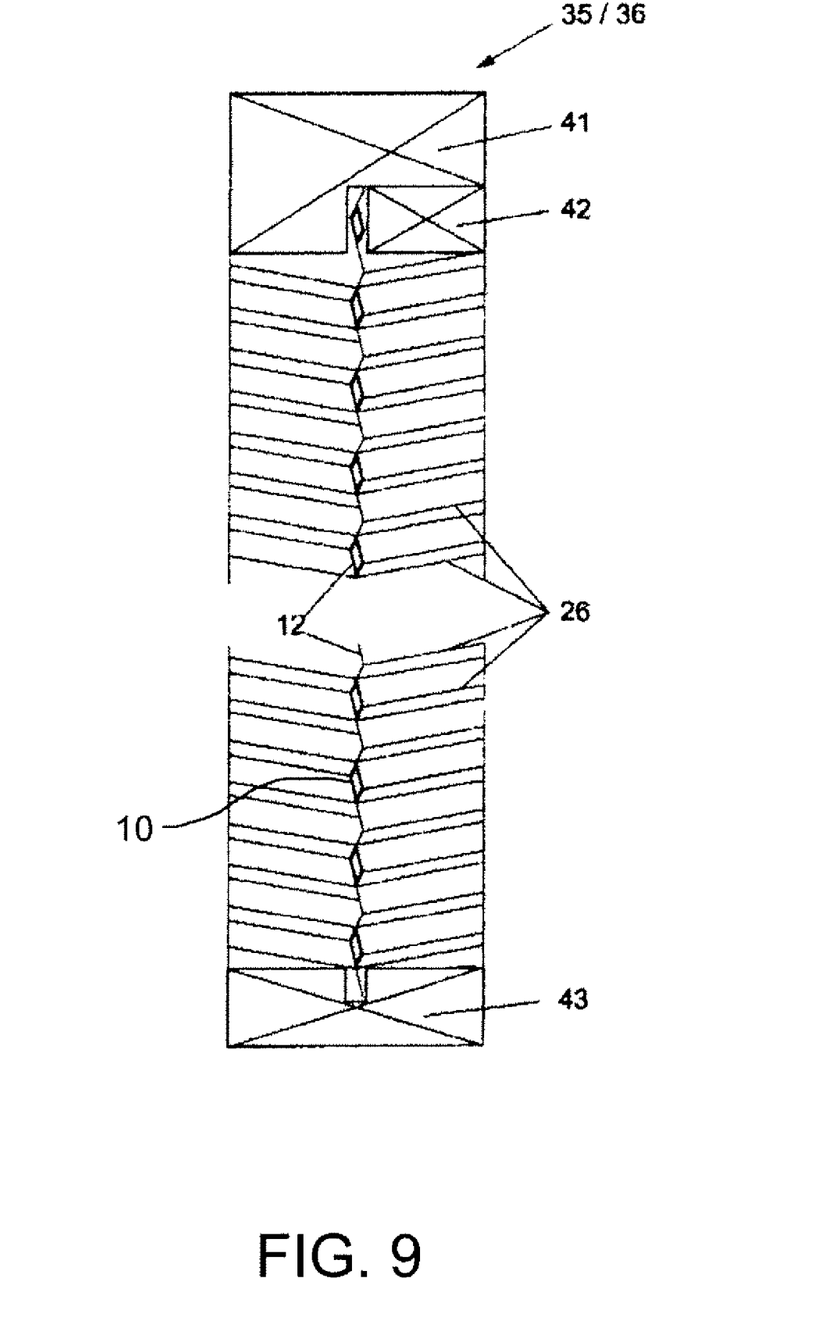
FIG. 9 is a vertical section of a sheet of honeycomb framework according to the second embodiment mounted in a frame.

In use, FIG. 9, each honeycomb foundation sheet 10 is mounted in a vertical frame whose height is selected according to its use as a brood frame 35 or honey frame 36. The frame has a top bar 41 and a bottom bar 43, the bottom edge of the foundation sheet 10 being located in a slot in the bottom bar and its top edge being held in place by a fixing wedge 42 attached to the top bar 41. In other embodiments the support frame may be formed integrally with the foundation.

Figure 10:
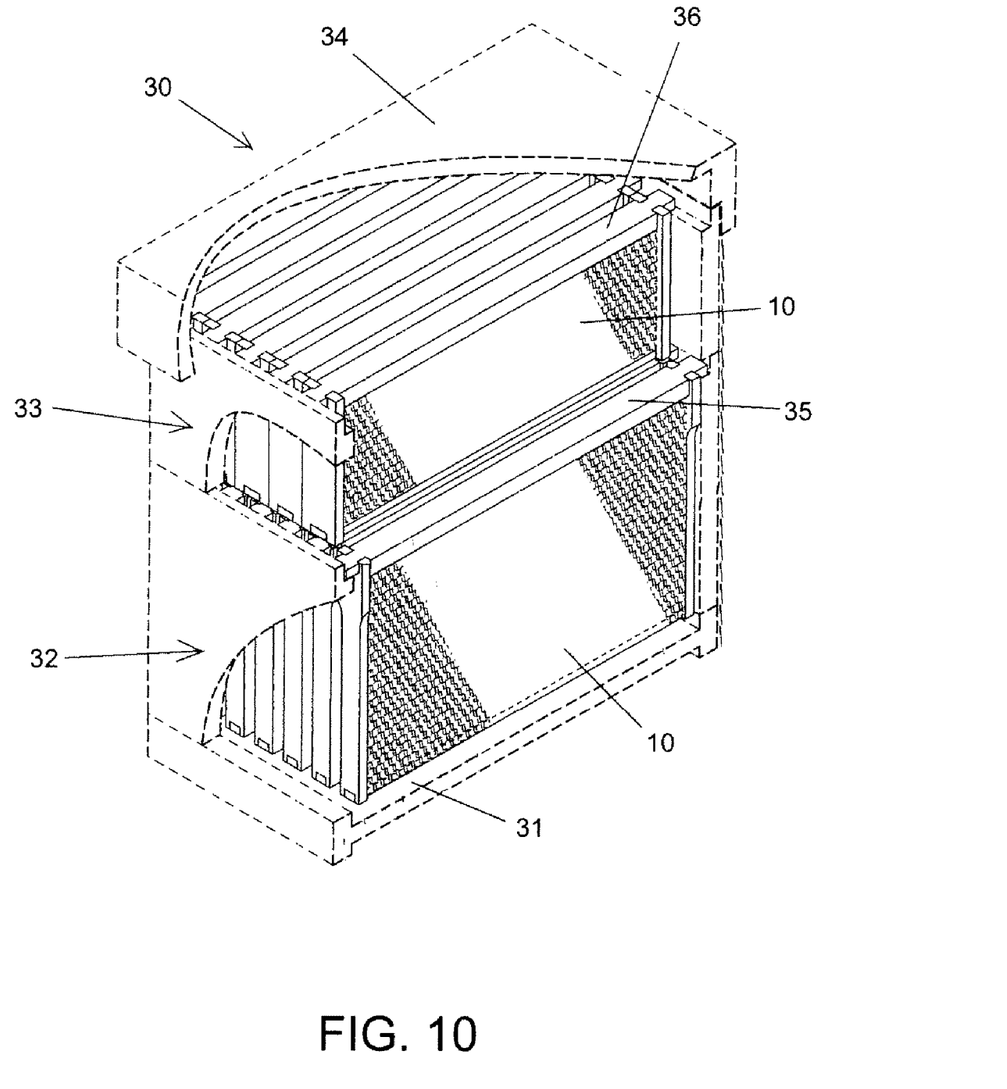
FIG. 10 shows sheets of foundation according to the embodiments of the invention mounted in a beehive.

In FIG. 10 a typical hive 30 is shown, where the frames 35, 36 containing the honeycomb foundation sheets 10, with or without the struts 26, are suspended. The hive comprises a floor 31, a brood chamber 32, a super 33 for honey gathering, and a roof 34. The brood chamber 32 contains a number of brood frames 35 and the super 33 contains a number of honey frames 36, each frame being appropriately spaced and hanging in parallel within its chamber.

The foregoing embodiments are particularly advantageous because they provide the beekeeper with an effective means of producing reinforced comb without recourse to elaborate equipment. Where used, the relatively thin wax coating is similar to that produced by bees in nature, leaving the comb more acceptable to them. Cell bases are not intruded upon, as the reinforcing structure and cell structure corresponds. Creating a frame of comb by coating honeycomb foundation with beeswax is a simple operation, which can be achieved using basic domestic appliances and the beekeeper's own wax resources. If combs become stale or damaged, the wax is easily removed and the skeletal structure recovered.

The principles described above can also be used in the construction of lightweight structural panels for use outside the beekeeping industry. In such a case the lattice (not necessarily of the form shown) would be made, for example, of fibreglass or carbon fibres and coated with a hard layer of, for example, a cured resin such as epoxy resin which covers the struts and forms a membrane across at least a majority of the lattice openings defined by the struts. To manufacture the panel the lattice would be dipped in the viscous uncured resin and the latter then cured (e.g. by heat or UV) or allowed to cure naturally.

Thus the present invention provides an improved honeycomb foundation which avoids interference with any of the cell bases defined thereby, and thus allows bees to use every cell base to draw comb, which maintaining simplicity of use for a beekeeper, and which can essentially be reused indefinitely.

The invention claimed is:

1. A honeycomb foundation sheet for beehives comprising a three-dimensional lattice of struts defining on at least one face of the sheet an array of open sided depressions framed by the struts; wherein the plurality of struts are arranged to define an array of depressions on both faces of the sheet; wherein the depressions on one face are integrated with the depressions of the other face; wherein each depression comprises a substantially hexagonal peripheral rim and three lattice openings extending away from the hexagonal peripheral rim and converging at an apex of the depression and the apex of a depression on one face of the sheet forms a corner of the hexagonal peripheral rim of three adjacent depressions on the other face of the sheet.

2. A foundation sheet according to claim 1, wherein each depression comprises a substantially hexagonal peripheral rim and three lattice openings extending away from the hexagonal peripheral rim and converging at an apex of the depression.

3. A foundation sheet according to claim 2, wherein each of the lattice openings defined by the struts is substantially rhombic in shape.

4. A foundation sheet according to claim 2 further comprising a layer of beeswax covering the struts and forming a membrane across at least a majority of the lattice openings defined by the struts.

5. A foundation sheet according to claim 1, wherein the geometry of each depression corresponds substantially with the geometry of a honeycomb cell base.

6. A foundation sheet according to claim 1, wherein each edge of each depression is defined by a single strut.

7. A foundation sheet according to claim 1, wherein the struts are substantially triangular in cross section.

8. A foundation sheet according to claim 7, wherein the struts framing each depression are oriented such that vertices of opposite struts point towards one another across each lattice opening.

9. A foundation sheet according to claim 1, wherein the struts framing each depression extend at an angle of less than 20° to a plane of the sheet.

10. The foundation sheet of claim 9, wherein the struts framing each depression extend at an angle of between 9° and 14° to the plane of the sheet.

11. A foundation sheet according to claim 1 further comprising a plurality of substantially parallel further struts extending away from the vertices of the hexagonal peripheral rim of each depression, the openings between adjacent further struts corresponding in shape and orientation to the walls of the honeycomb cells.

12. A foundation sheet according to claim 1 further comprising a support frame provided about the lattice of struts.

13. A foundation sheet according to claim 1 wherein the sheet is molded from a plastic material.

14. The foundation sheet of claim 1, wherein the struts are substantially deltoid in cross section.

15. A method of making a honeycomb foundation sheet for beehives, comprising forming a foundation sheet for beehives comprising a three-dimensional lattice of struts defining on at least one face of the sheet an array of depressions framed by the struts, which depressions comprise three lattice openings extending away from a hexagonal peripheral rim, coating the sheet in beeswax to provide a layer of beeswax covering the struts and forming a membrane across at least a majority of the lattice openings defined by the struts, and allowing the beeswax to solidify on the lattice.

* * * * *